United States Patent
Sainath et al.

(10) Patent No.: US 9,373,324 B2
(45) Date of Patent: Jun. 21, 2016

(54) APPLYING SPEAKER ADAPTION TECHNIQUES TO CORRELATED FEATURES

(71) Applicant: International Business Machines Corporation, Armonk, NY (US)

(72) Inventors: Tara N. Sainath, Jersey City, NJ (US); George A. Saon, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 14/314,554

(22) Filed: Jun. 25, 2014

(65) Prior Publication Data

US 2015/0161993 A1 Jun. 11, 2015

Related U.S. Application Data

(60) Provisional application No. 61/912,688, filed on Dec. 6, 2013.

(51) Int. Cl.
| | |
|---|---|
| *G10L 15/00* | (2013.01) |
| *G10L 15/07* | (2013.01) |
| *G10L 19/00* | (2013.01) |
| *G10L 15/02* | (2006.01) |

(52) U.S. Cl.
CPC ........ *G10L 15/07* (2013.01); *G10L 15/02* (2013.01)

(58) Field of Classification Search
CPC .......... G10L 15/14; G10L 15/07; G10L 15/02
USPC .......................... 704/216, 217, 218, 237, 263
See application file for complete search history.

(56) References Cited

U.S. PATENT DOCUMENTS

| | | | |
|---|---|---|---|
| 7,523,034 | B2 | 4/2009 | Deligne et al. |
| 7,725,316 | B2 | 5/2010 | Chengalvarayan et al. |
| 7,805,301 | B2 | 9/2010 | Tian et al. |
| 8,024,183 | B2 | 9/2011 | Navratil et al. |
| 2012/0101817 | A1 | 4/2012 | Mocenigo et al. |
| 2012/0288100 | A1 | 11/2012 | Cho |
| 2013/0096915 | A1 | 4/2013 | Rennie et al. |

OTHER PUBLICATIONS

M.J.F. Gales, "Semi-Tied Covariance Matrices for Hidden Markov Models," IEEE Transactions on Speech and Audio Processing, vol. 7, No. 3, 1999, pp. 272-281.
M.J.F. Gales, "Maximum Likelihood Linear Transformations for HMM-based Speech Recognition," Computer Speech and Language, vol. 12, No. 2, Apr. 1998, pp. 75-98.
T.N. Sainath et al., "Improvements to Deep Convolutional Neural Networks for LVCSR," Automated Speech Recognition and Understanding (ASRU) Workshop, Dec. 8, 2013, 6 pages.
T.N. Sainath et al., "Deep Convolutional Neural Networks for LVCSR," Proceedings of ICASSP, May 2013, 5 pages.
G.E. Dahl et al., "Improving Deep Neural Networks for LVCSR Using Rectified Linear Units and Dropout," Proceedings of ICASSP, May 2013, 7 pages.
H. Soltau et al., "Joint Training of Convolutional and Non-Convolutional Neural Networks," International Conference on Acoustics, Speech and Signal Processing (ICASSP), May 4, 2014, 3 pages, Florence, Italy.

*Primary Examiner* — Thierry L Pham
(74) *Attorney, Agent, or Firm* — William Stock; Ryan, Mason & Lewis, LLP (57) ABSTRACT

Systems and methods for applying feature-space maximum likelihood linear regression (fMLLR) to correlated features are provided. A method for applying fMLLR to correlated features, comprises mapping the correlated features into an uncorrelated feature space, applying fMLLR in the uncorrelated feature space to obtain fMLLR transformed features, and mapping the fMLLR transformed features back to a correlated feature space.

20 Claims, 6 Drawing Sheets

APPLYING SPEAKER ADAPTION TECHNIQUES TO CORRELATED FEATURES

CROSS-REFERENCE TO RELATED APPLICATION

This application claims the benefit of U.S. Provisional Patent Application Ser. No. 61/912,688, filed on Dec. 6, 2013, the contents of which are herein incorporated by reference in their entirety.

TECHNICAL FIELD

The field generally relates to systems and methods for applying speaker adaption techniques to correlated features and, in particular, systems and methods for applying feature-space maximum likelihood linear regression (fMLLR) to correlated features.

BACKGROUND

Deep Neural Networks (DNNs) are well-known in acoustic modeling for speech recognition, showing improvements of about 10%-30% relative to previous modeling methods across a variety of small and large vocabulary tasks. Recently, deep convolutional neural networks (CNNs) have been explored as an alternative type of neural network which can reduce translational variance in an input signal. For example, deep CNNs have been shown to offer between a 4%-12% relative improvement over DNNs across a variety of large vocabulary continuous speech recognition (LVCSR) tasks. Since CNNs model correlation in time and frequency, they require an input feature space to have this property. As a result, commonly used feature spaces, such as Linear Discriminant Analysis (LDA), cannot be used with CNNs. Common speech features which are correlated in time and frequency include Fast Fourier Transform (FFT) and Mel Filterbank (melFB) features.

Correlated features are better modeled by full-covariance Gaussians rather than diagonal Gaussians. However, full-covariance matrices dramatically increase the number of parameters per Gaussian component, often leading to parameter estimates which are not robust. Semi-tied covariance matrices (STCs) have been used to decorrelate a feature space so that it can be modeled by diagonal Gaussians. STC allows a few full covariance matrices to be shared over many distributions, while each distribution has its own diagonal covariance matrix. A covariance matrix can be full or diagonal. When the matrix is diagonal, it is the dimensions are not correlated, but when the matrix is full the dimensions are correlated.

Feature-space maximum likelihood linear regression (fMLLR) is a speaker-adaptation technique used to reduce variability of speech due to different speakers. fMLLR is a transformation that is applied to features, assuming that these features are uncorrelated and can be modeled by a diagonal covariance Gaussian, or the features are correlated and can be modeled by full covariance Gaussians.

Due to issues in parameter estimation with full covariance Gaussians, fMLLR is more commonly applied to a decorrelated space. When fMLLR is applied to a correlated feature space with a diagonal covariance assumption, little improvement in word error rate (WER) have been observed. Accordingly, there is a need for systems and methods which improve WER by applying fMLLR to correlated features using a diagonal Gaussian approximation.

SUMMARY

In general, exemplary embodiments of the invention include systems and methods for applying speaker adaption techniques to correlated features and, in particular, systems and methods for applying feature-space maximum likelihood linear regression (fMLLR) to correlated features.

According to an exemplary embodiment of the present invention, a system for applying feature-space maximum likelihood linear regression (fMLLR) to correlated features, comprises a semi-tied covariance (STC) module capable of mapping the correlated features into an uncorrelated feature space, an fMLLR module capable of applying fMLLR in the uncorrelated feature space to obtain fMLLR transformed features, and a return module capable of mapping the fMLLR transformed features back to a correlated feature space.

According to an exemplary embodiment of the present invention, a method for applying fMLLR to correlated features, comprises mapping the correlated features into an uncorrelated feature space, applying fMLLR in the uncorrelated feature space to obtain fMLLR transformed features, and mapping the fMLLR transformed features back to a correlated feature space.

According to an exemplary embodiment of the present invention, a computer program product for applying fMLLR to correlated features comprises a computer readable storage medium having program instructions embodied therewith, the program instructions executable by a processor to cause the processor to perform a method comprising mapping the correlated features into an uncorrelated feature space, applying fMLLR in the uncorrelated feature space to obtain fMLLR transformed features, and mapping the fMLLR transformed features back to a correlated feature space.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the invention will now be discussed in further detail with regard to systems and methods for applying speaker adaption techniques to correlated features and, in particular, systems and methods for applying feature-space maximum likelihood linear regression (fMLLR) to correlated features. This invention may, however, be embodied in many different forms and should not be construed as limited to the embodiments set forth herein.

Embodiments of the present invention include systems and methods for applying fMLLR to correlated features (such as log-mel) using a diagonal Gaussian approximation, while ensuring that the features remain in the correlated space after fMLLR. In general, log-mel features are obtained by computing the short-time Fourier transform of an input signal, applying a mel filterbank to the signal which mimics the critical band of hearing, and then taking the log. It is to be understood that embodiments of the present invention are not limited to log-mel, and may be applied to other types of correlated features.

Embodiments of the present invention describe different methods to further improve CNN performance by developing appropriate CNN architecture for speech. An embodiment of the present invention introduces a method to effectively incorporate speaker adaptation, namely fMLLR, into log-mel features. Embodiments of the present invention further introduce an effective strategy to use dropout during Hessian-free sequence training.

As illustrated further herein, experimental applications of the embodiments of the present invention using fMLLR and dropout, resulted in an additional 2-3% relative improvement in WER on a 50-hour Broadcast News task over a previous best CNN baseline. On a larger 400-hour Broadcast News task, an additional 4-5% relative improvement over the previous best CNN baseline was shown.

Features for CNNs must exhibit locality in time and frequency. Speaker adapted features, such as feature-space maximum likelihood linear regression (fMLLR) features provide relatively good performance for DNNs. In accordance with an embodiment of the present invention, a method is provided for effectively using fMLLR with log-mel features, which involves transforming log-mel into an uncorrelated space, applying fMLLR in this space, and then transforming the new features back to a correlated space.

Embodiments of the present invention also take into account the role of rectified linear units (ReLU) and dropout for Hessian-free (HF) sequence training of CNNs. In G. E. Dahl, T. N. Sainath, and G. E. Hinton, "Improving Deep Neural Networks for LVCSR Using Rectified Linear Units and Dropout," in *Proc. ICASSP,* 2013 (hereinafter "Dahl et al."), which is incorporated by reference herein, ReLU+dropout was shown to give good performance for cross-entropy (CE) trained DNNs, but was not employed during HF sequence-training. However, sequence-training provides an additional relative gain of 10-15% over a CE-trained DNN. During CE training, the dropout mask changes for each utterance. However, during HF training, obtaining conjugate directions is not guaranteed if the dropout mask changes for each utterance. Therefore, in order to make dropout usable during HF, embodiments of the present invention keep the dropout mask fixed per utterance for all iterations of conjugate gradient (CG) within a single HF iteration.

As noted above, experimental applications of embodiments of the present invention were explored on a 50-hr English Broadcast News (BN) task. Embodiments of the present invention show that improving the CNN input features by including fMLLR gives improvements in WER, and that fixing the dropout mask during the CG iterations of HF permits use of dropout during HF sequence training and avoids destroying the gains from dropout accrued during CE training Putting together improvements from fMLLR and dropout, experimental applications of the embodiments of the present invention obtained a 2-3% relative reduction in WER compared to previous CNN systems. In addition, on a larger 400-hr BN task, experimental applications of embodiments of the present invention were shown to achieve a 4-5% relative improvement in WER.

CNN Architecture

The CNN architecture that was introduced in T. N. Sainath, A. Mohamed, B. Kingsbury, and B. Ramabhadran, "Deep Convolutional Neural Networks for LVCSR," in *Proc. ICASSP,* 2013 (hereinafter "Sainath et al."), which is incorporated by reference herein, is described herein, and serves as a baseline system which embodiments of the present invention improve upon. The optimal feature set used was vocal tract length normalization (VTLN)-warped log-mel filterbank coefficients, including delta+double delta. Using this architecture for CNNs, a 4-12% relative improvement over DNNs across many different LVCSR tasks was achieved. It is to be understood that embodiments of the present invention are not limited to this feature set, and may be applied to other feature sets.

Using feature, architecture and optimization strategies, embodiments of the present invention further improve the CNN results. As referenced above, experiments were performed on a 50-hr English Broadcast News task, where acoustic models were trained on 50 hours from the 1996 and 1997 English Broadcast News Speech Corpora. Results were reported on the Effective Affordable Reusable Speech-to-Text (EARS) dev04f set. Unless otherwise noted, all CNNs were trained with cross-entropy, and results were reported in a hybrid setup.

Multi-Scale CNN/DNN

The information captured in each layer of a neural network varies from more general to more specific concepts. For example, in speech lower layers focus more on speaker adaptation and higher layers focus more on discrimination. With multi-scale CNN/DNN, inputs from different layers of a neural network are combined to explore if complementarity between different layers could potentially improve results further. This idea, known as multi-scale neural networks has been explored before for computer vision.

Specifically, the output from 2 fully connected and 2 convolutional layers are combined. This output is fed into 4 more fully-connected layers, and the entire network is trained jointly. This can be thought of as combining features generated from a DNN-style and CNN-style network. In experimental applications, the same input features, (i.e., log-mel features) were used for both DNN and CNN streams. Results are shown in Table 1.

Referring to Table 1, a small gain is observed by combining DNN and CNN features, which is smaller than gains observed in computer vision. However, the small improvement comes at the cost of such a large parameter increase, and the same gains may be achieved by increasing feature maps in the CNN alone (see Table 1). It is possible however, that combining CNNs and DNNs with different types of input features which are complimentary, could potentially show more improvements.

TABLE 1

Multi-scale CNN vs. DNN

| Method | Params | WER |
| --- | --- | --- |
| CNN alone | 5.6M | 18.9 |
| Multi-scale CNN/DNN | 9.5M | 18.6 |

Improved Speaker Adapted Features

Improvements to CNN input features in accordance with an embodiment of the present invention are described herein.

Algorithm Description

Since CNNs model correlation in time and frequency, they require the input feature space to have this property. This implies that commonly used feature spaces, such as Linear Discriminant Analysis, cannot be used with CNNs. In Sainath et al., it was shown that a good feature set for CNNs was VTLN-warped log-mel filter bank coefficients.

Feature-space maximum likelihood linear regression (fMLLR) is a speaker-adaptation technique used to reduce variability of speech due to different speakers. The fMLLR transformation applied to features assumes that either features are uncorrelated and can be modeled by diagonal covariance Gaussians, or features are correlated and can be modeled by a full covariance Gaussians.

While correlated features may be better modeled by full-covariance Gaussians, full-covariance matrices dramatically increase the number of parameters per Gaussian component, often leading to parameter estimates which are not robust. Thus, fMLLR is commonly applied to a decorrelated space. When fMLLR was applied to the correlated log-mel feature space with a diagonal covariance assumption, little improvement in WER was observed.

Semi-tied covariance matrices (STCs) have been used to decorrelate the feature space so that it can be modeled by diagonal Gaussians. STC offers the added benefit in that it allows a few full covariance matrices to be shared over many distributions, while each distribution has its own diagonal covariance matrix.

Embodiments of the present invention apply fMLLR to correlated features (such as log-mel) by first decorrelating the features such that a diagonal Gaussian approximation can be appropriately used with fMLLR. Embodiments of the present invention then transform the fMLLR features back to the correlated space so that the features can be used with CNNs.

The algorithm to do this is described as follows. In accordance with an embodiment of the present invention, starting from correlated feature space f, an STC matrix S is estimated to map the features into an uncorrelated space. This mapping is given by equation (1):

$$Sf \tag{1}$$

Next, in the uncorrelated space, an fMLLR M matrix is estimated, and is applied to the STC transformed features. This is shown by equation (2):

$$MSf \tag{2}$$

Thus far, equations (1) and (2) demonstrate standard transformations in speech with STC and fMLLR matrices. However, in speech recognition tasks, once features are decorrelated with STC, further transformation (i.e., fMLLR, feature-space boosted maximum mutual information (fBMMI)) are applied in this decorrelated space, as shown in equation (3). The features are not transformed back into the correlated space.

However for CNNs, using correlated features is critical. Embodiments of the present invention show that by multiplying the fMLLR transformed features by an inverse STC matrix, the decorrelated fMLLR features can be mapped back to the correlated space, so that they can be used with a CNN. The proposed transformation is given in Equation (3):

$$S^{-1}MSf \tag{3}$$

Figure 1:
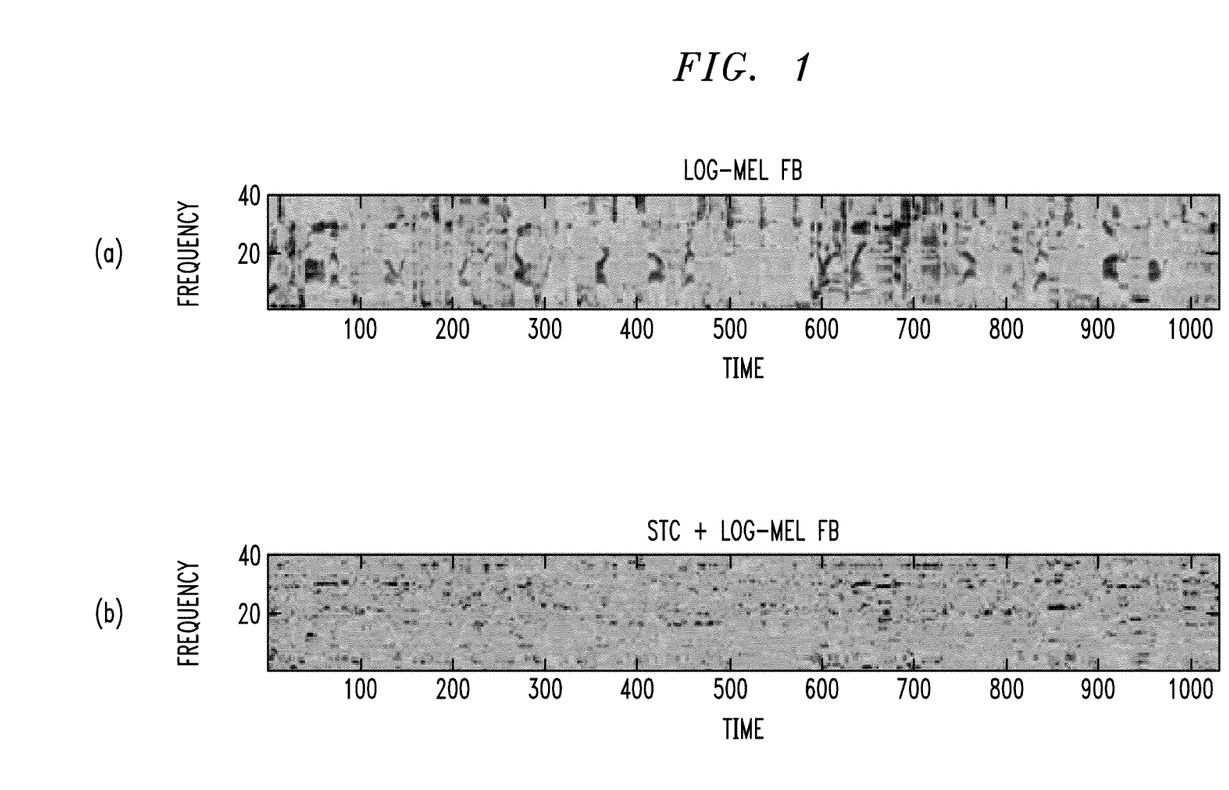
FIGS. 1(a) and 1(b) respectively plot a spectrogram of the correlated feature representation, as well as the spectrogram of the decorrelated features once an STC transformation is applied, according to an exemplary embodiment of the invention.

Application of the embodiment from Equation (3) was experimentally demonstrated on a 50-hr English Broadcast News task. The correlated features that the CNN are trained with are log-mel filterbank coefficients. FIGS. 1(a) and 1(b) respectively plot a spectrogram of this feature representation, as well as the spectrogram once an STC transformation is applied. Referring to FIGS. 1(a) and 1(b), the correlation in frequency with log-mel filterbank coefficients, and the decorrelation once the STC transformation is applied can be noticed. As can be seen, in the correlated spectrogram of FIG. 1(a), neighboring frequency points at a given time are similar in intensity to each other, whereas in the decorrelated spectrogram of FIG. 1(b), the intensities are random.

Figure 2:
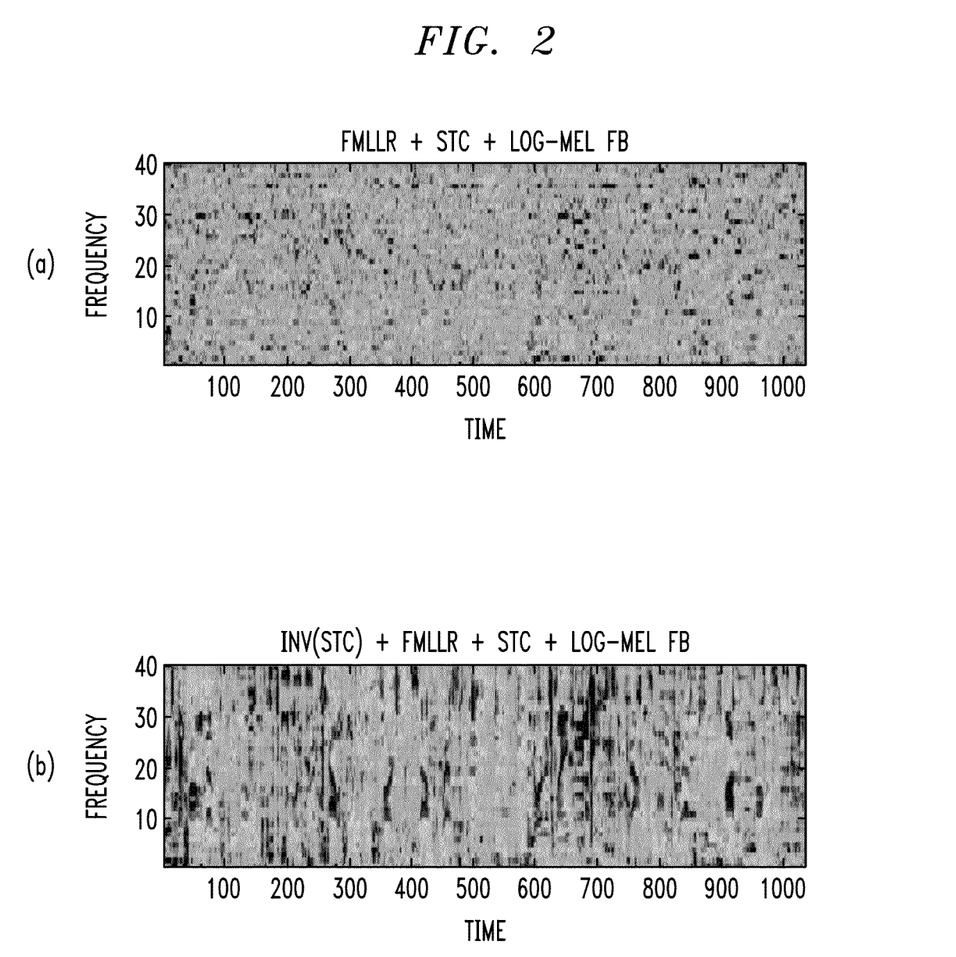
FIGS. 2(a) and 2(b) respectively show a spectrogram obtained by applying an fMLLR transformation, followed by inverse STC, according to an exemplary embodiment of the invention.

FIGS. 2(a) and 2(b) respectively show a spectrogram obtained by applying an fMLLR transformation, followed by inverse STC. The fMLLR transformation is done in the decorrelated feature space, while the inverse STC transformation brings the features back to a correlated space.

Experimentally, it was compared if an embodiment of the present invention shows improvements in WER on the 50-hr English Broadcast News task. Results from Table 2 indicate that the fMLLR technique in accordance with an embodiment of the present invention, offers a 0.5% absolute improvement in WER. Accordingly, by applying fMLLR in a decorrelated space, a 0.5% improvement over a baseline VTLN-warped log-mel system can be achieved. Such a gain is not possible when fMLLR is applied directly to correlated log-mel features. It is to be understood that log-mel FB can also be referred to as VTLN-warped log-mel in Table 2.

TABLE 2

WER With Improved fMLLR Features

| Method | WER |
| --- | --- |
| log-mel FB + d + dd | 18.8 |
| (log-mel FB + proposed fmllr) + d + dd | 18.3 |

Figure 3:
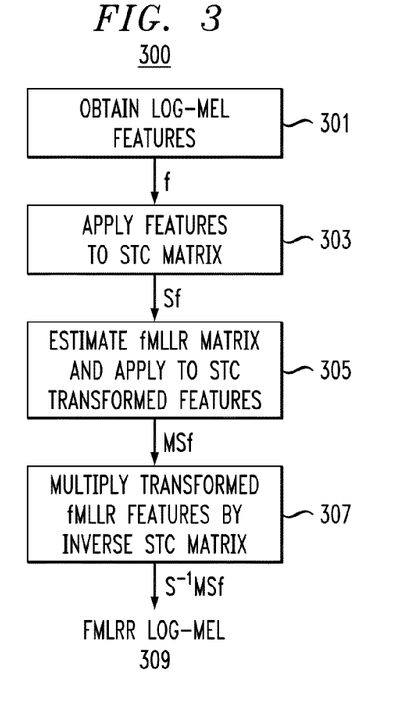
FIG. 3 is a block diagram of a process for applying fMLLR to correlated features, according to an exemplary embodiment of the invention.

FIG. 3 is a block diagram of a process 300 of obtaining correlated fmllr-log mel features. As stated above, embodiments of the present invention apply fMLLR to correlated features (such as log-mel) by first decorrelating the features to permit diagonal Gaussian approximation to be used with fMLLR. Embodiments of the present invention then transform the fMLLR features back to the correlated space so that the features can be used with CNNs.

Referring to FIG. 3, the correlated log-mel features f are obtained (block 301) and are applied to an STC matrix S (block 303), with the output from block 303 being Sf, as in equation (1). Next, in the uncorrelated space, an fMLLR M matrix is estimated, and is applied to the STC transformed features (block 305), with the output being MSf, as in equation (2).

As stated above, for CNNs, using correlated features is critical. Accordingly, the fMLLR transformed features output from block 305 are multiplied by an inverse STC matrix (block 307), with the output being $S^{-1}MSf$, as in equation (3). As a result, the decorrelated fMLLR features are mapped back to the correlated space, so that they can be used with a CNN. The correlated fmllr-log mel features 309 are therefore obtained as the output from block 307.

Figure 4:
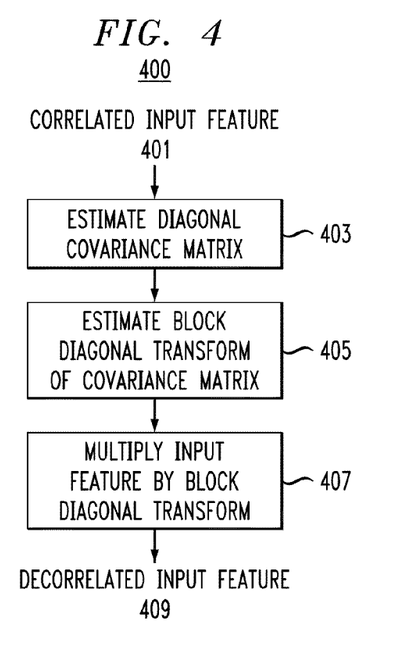
FIG. 4 is a block diagram of, a process for estimating and applying the STC matrix to result in the decorrelated features, according to an exemplary embodiment of the invention.

FIG. 4 illustrates a process 400 for estimating and applying the STC matrix S to result in the decorrelated features as the output of block 303. Taking as an input the correlated features (i.e., log-mel) 401, a diagonal covariance matrix is estimated from the data (block 403). Then, using the correlated features and the diagonal covariance matrix, a block diagonal transform of the diagonal covariance matrix is estimated (block 405) to result in the STC matrix S. Then, the STC matrix S is multiplied by the input features f (block 407), with the output from block 407 being the decorrelated input features 409, or Sf as in equation (1).

In the following expression, $\Sigma^{(m)}$ is a covariance matrix, $\Sigma_{diag}^{(m)}$ is a diagonal covariance matrix, and $A^{(r)'}$ is a block diagonal transform of the covariance matrix. See M. J. F. Gales, "Semi-tied Covariance Matrices for Hidden Markov Models," *IEEE Transactions on Speech and Audio Processing*, vol. 7, pp. 272-281, (May 1999), which is incorporated by reference herein.

$$\Sigma^{(m)} = A^{(r)'} \Sigma_{diag}^{(m)} A^{(r)'T} \quad (4)$$

Figure 5:
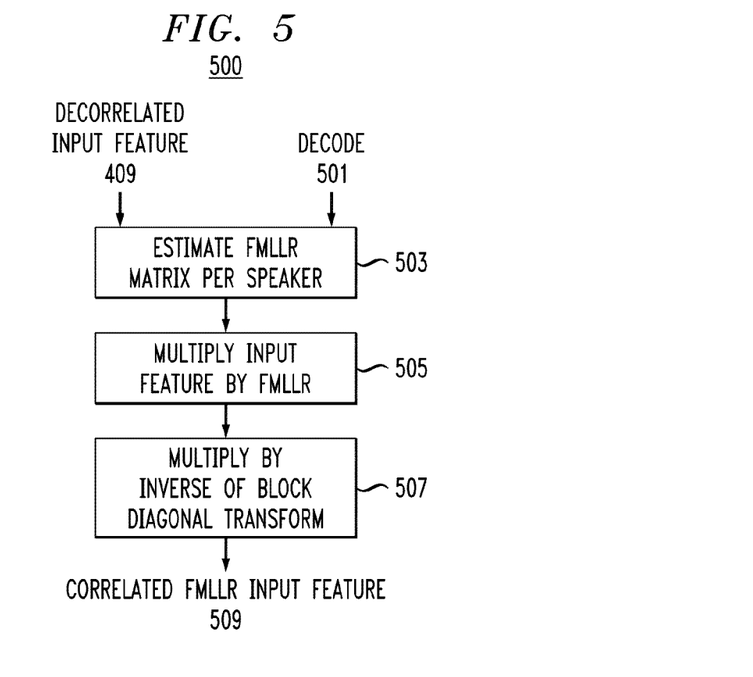
FIG. 5 is a block diagram of a process including estimation of the fMLLR matrix, and its application to the decorrelated features, according to an exemplary embodiment of the invention.

FIG. 5 illustrates a process 500 including estimation of the fMLLR matrix, and its application to the decorrelated features. Taking as inputs the decorrelated input features 409, and decode from previous models 501, an fMLLR matrix per speaker is estimated (block 503). A previous model is used to produce a decode, which is a hypothesis of what is being spoken. This decode is then used for fMLLR. Then, at block 505, the fMLLR matrix M is multiplied by the decorrelated features 409 to result in the fMLLR features, or MSf, as in equation (2) as the output from block 505. Then, at block 507, the output of block 505 is multiplied by the inverse STC matrix, with the output 509 being the correlated fMLLR features, or $S^{-1}MSf$, as in equation (3). Further information regarding estimating an fMLLR matrix can be found in M. J. F. Gales, "Maximum likelihood linear transformations for HMM-based Speech Recognition," *Computer Speech and Language*, vol. 12, no. 2, pp. 75-98, (April 1998), which is incorporated by reference herein.

Rectified Linear Units and Dropout

Embodiments of the present invention also provide a strategy to make dropout effective during Hessian-free (HF) sequence training.

Neural Network training can include training of DNNs with a frame-discriminative stochastic gradient descent (SGD) cross-entropy (CE) criterion, and readjustment of CE-trained DNN weights using a sequence-level objective function. Since speech is a sequence-level task, this objective may be more appropriate for the speech recognition problem. Studies have shown that sequence training provides an additional 10-15% relative improvement over a CE trained DNN. Using a $2^{nd}$ order HF optimization method can be critical for performance gains with sequence training compared to SGD-style optimization.

Rectified Linear Units (ReLU) and Dropout have been proposed as a way to regularize large neural networks. ReLU+dropout has been shown to provide a 5% relative reduction in WER for cross-entropy-trained DNNs on a 50-hr English Broadcast News LVCSR task. However, subsequent HF sequence training that used no dropout erased some of these gains, and performance was similar to a DNN trained with a sigmoid non-linearity and no dropout. Given the importance of sequence-training for neural networks, embodiments of the present invention propose a strategy to make dropout effective during HF sequence training. Results are presented in the context of CNNs, though the algorithm in accordance with an embodiment of the present invention, can also be used with DNNs.

Hessian-Free Training

In accordance with an embodiment of the present invention, let $\theta$ denote the network parameters, $\mathcal{L}(\theta)$ denote a loss function, $\nabla \mathcal{L}(\theta)$ denote the gradient of the loss with respect to the parameters, d denote a search direction, and $B(\theta)$ denote a Hessian approximation matrix characterizing the curvature of the loss around $\theta$. A central idea in HF optimization is to iteratively form a quadratic approximation to the loss and to minimize this approximation using conjugate gradient (CG).

$$\mathcal{L}(\theta + d) \approx \mathcal{L}(\theta) + \nabla \mathcal{L}(\theta)^T d + \frac{1}{2} d^T B(\theta) d \quad (5)$$

In accordance with an embodiment of the present invention, during each iteration of the HF algorithm, first, the gradient is computed using all training examples. Second, since the Hessian cannot be computed exactly, the curvature matrix B is approximated by a damped version of the Gauss-Newton matrix $G(\theta) + \lambda I$, where $\lambda$ is set via Levenberg-Marquardt. Then, Conjugate gradient (CG) is run for multiple-iterations until the relative per-iteration progress made in minimizing the CG objective function falls below a certain tolerance. During each CG iteration, Gauss-Newton matrix-vector products are computed over a sample of the training data.

Dropout

Dropout is a technique to prevent over-fitting during neural network training. Specifically, during a feed-forward operation in neural network training, dropout omits each hidden unit randomly with probability p. This prevents complex co-adaptations between hidden units, forcing hidden units to not depend on other units. Specifically, using dropout the activation $y^l$ at layer l is given by Equation 6, where $y^{l-1}$ is the input into layer l, $W^l$ is the weight for layer l, b is the bias, $f$ is the non-linear activation function (i.e., ReLU) and r is a binary mask, where each entry is drawn from a Bernoulli(p) distribution with probability p of being 1. Since dropout is not used during decoding, the factor $1/1-p$ used during training ensures that at test time, when no units are dropped out, the correct total input will reach each layer.

$$y^l = f\left(\frac{1}{1-p} W^l(r^{l-1} * y^{l-1}) + b^l\right) \quad (6)$$

Combining HF+Dropout

Conjugate gradient (CG) attempts to minimize the quadratic objective function given in Equation 5. For each CG iteration, the damped Gauss-Newton matrix, $G(\theta)$, is estimated using a subset of the training data. This subset is fixed for all iterations of CG. This is because if the data used to estimate $G(\theta)$ changes, conjugate search directions from iteration to iteration are no longer guaranteed.

Dropout produces a random binary mask for each presentation of each training instance. However, in order to guarantee good conjugate search directions, for a given utterance, the dropout mask per layer does not change during CG. In accordance with embodiments of the present invention, to incorporate dropout into HF the dropout mask is allowed to change for different layers and different utterances, and is fixed for all CG iterations while working with a specific layer and specific utterance (although the masks can be refreshed between HF iterations).

As the number of network parameters is large, saving out the dropout mask per utterance and layer does not appear practical. Therefore, in accordance with embodiments of the present invention, a seed is randomly chosen for each utterance and layer and saved out. Using a randomize function with the same seed guarantees that the same dropout mask is used per layer/per utterance.

It was experimentally confirmed that using a dropout probability of p=0.5 in the 3rd and 4th layers is reasonable, and the dropout in all other layers is zero. However, embodiments of the present invention are not necessarily limited thereto. For these experiments, 2K hidden units for the fully connected layers were used, as this was found to be more beneficial with dropout compared to 1K hidden units. However, is to be understood that embodiments of the present invention are not limited to 2K hidden units.

Figure 6:
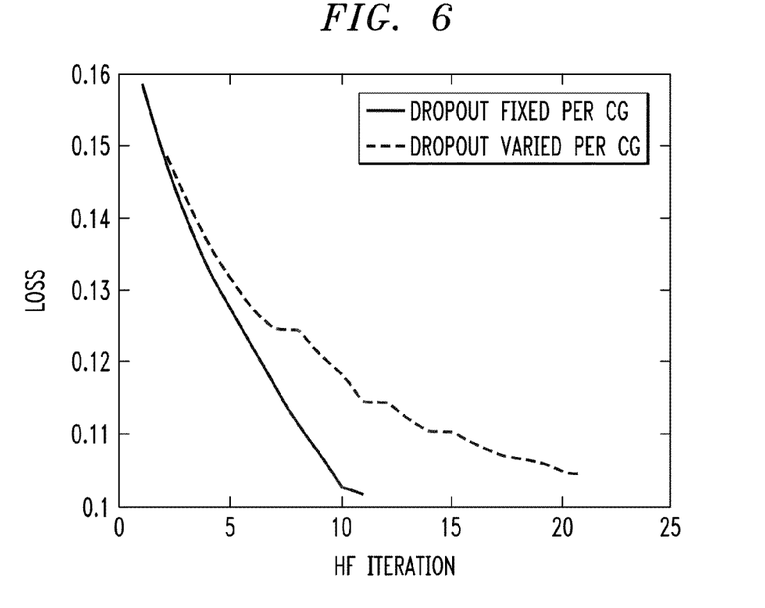
FIG. 6 is a graph plotting held-out loss with dropout techniques, according to an exemplary embodiment of the invention.

Results applying different dropout techniques, in accordance with embodiments of the present invention, are shown in Table 3. As can be seen from Table 3, if no dropout is used, the WER is essentially the same as sigmoid, a result which was also found for DNNs. By using dropout, but fixing the dropout mask per utterance across all CG iterations, a 0.6% improvement in WER can be achieved. Finally, if this is compared to varying the dropout mask per CG training iteration, the WER increases. As can be seen in FIG. 6, which plots held-out loss with dropout techniques, if the dropout mask is varied, there is slow convergence of the loss during training, particularly when the number of CG iterations increases during a latter part of HF training. Accordingly, there is experimental evidence that if the dropout mask is not fixed, it cannot be guaranteed that CG iterations produce conjugate search directions for the loss function.

TABLE 3

WER of HF Sequence Training + Dropout

| Non-Linearity | WER |
|---|---|
| Sigmoid | 15.7 |
| ReLU, No Dropout | 15.6 |
| ReLU, Dropout Fixed for CG Iterations | 15.0 |
| ReLU, Dropout Per CG Iteration | 15.3 |

Embodiments of the present invention also attempt to reduce the number of CE iterations before moving to sequence training. A benefit of sequence training is that it is more closely linked to the speech recognition objective function compared to cross-entropy. Using this fact, embodiments of the present invention attempt to define how many iterations of CE are actually necessary before moving to HF training. Table 4 shows the WER for different CE iterations, and the corresponding WER after HF training. HF training is started and lattices are dumped using the last CE weight. As can be seen in Table 4, just by annealing two times, the same WER after HF training can be achieved, compared to having the CE weights converge. Therefore, spending too much time in CE appears to be unnecessary. In accordance with an embodiment of the present invention, once the weights are in a relatively decent space, the process jumps to HF sequence training, which is more closely matched to the speech objective function.

TABLE 4

HF Seq. Training WER Per CE Iteration

| CE Iter | # Times Annealed | CE WER | HF WER |
|---|---|---|---|
| 4 | 1 | 20.8 | 15.3 |
| 6 | 2 | 19.8 | 15.0 |
| 8 | 3 | 19.4 | 15.0 |
| 13 | 7 | 18.8 | 15.0 |

Figure 7:
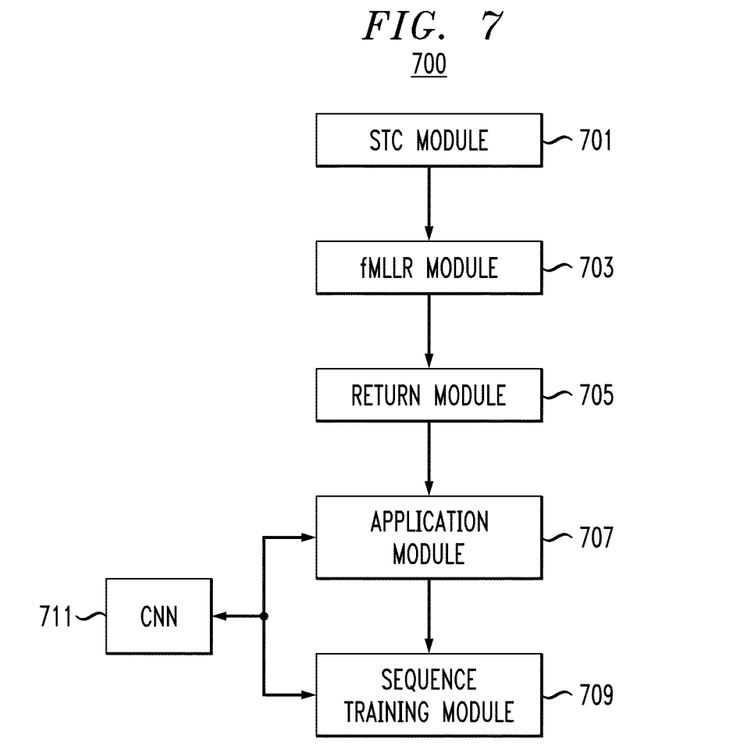
FIG. 7 is a block diagram of a system for applying fMLLR to correlated features, according to an exemplary embodiment of the present invention.

Referring to FIG. 7, which is a block diagram of a system for applying feature-space maximum likelihood linear regression (fMLLR) to correlated features, according to an exemplary embodiment of the present invention, the system 700 comprises a semi-tied covariance (STC) module 701, an fMLLR module 703, a return module 705, an application module 707, and a sequence training module 709.

The STC module 701 maps correlated features (e.g., log-mel filter bank coefficients) into an uncorrelated feature space by estimating an STC matrix in the correlated feature space and applying the STC matrix to the correlated features to map STC features into the uncorrelated space. The STC module estimates the STC matrix by estimating a diagonal covariance matrix from the correlated features, and estimating a block diagonal transform of a covariance matrix using the correlated features and the diagonal covariance matrix.

The fMLLR module 703 applies fMLLR in the uncorrelated feature space to obtain fMLLR transformed features by estimating an fMLLR matrix and applying the fMLLR matrix to the STC features to obtain the fMLLR transformed features. Estimating the fMLLR matrix is done per each speaker of a plurality of speakers, and applying the fMLLR matrix to the STC features is performed by multiplying the fMLLR matrix by the STC features.

The return module 705 maps the fMLLR transformed features back to a correlated feature space by multiplying the fMLLR transformed features by an inverse of the STC matrix. The application module 707 uses the fMLLR transformed features mapped back to the correlated feature space with a convolutional neural network 711.

The sequence training module 709 uses a dropout technique during Hessian-Free (HF) sequence training of a convolutional neural network 711, wherein a dropout mask is fixed per utterance for all iterations of conjugate gradient (CG) within a single HF iteration.

Experimental Results

CNN performance was experimentally analyzed with the additions proposed herein, namely fMLLR and ReLU+dropout in accordance with embodiments of the present invention. Results are shown on both a 50- and 400-hr English Broadcast News task.

Experimental Setup for 50-Hour English Broadcast News

Following a setup in Sainath et al., a hybrid DNN was trained using speaker adapted, VTLN+fMLLR features as input, with a context of 9 frames. A 5-layer DNN with 1,024 hidden units per layer and a sixth softmax layer with 2,220 output targets were used. All DNNs were pre-trained, followed by CE training and then HF sequence-training. The DNN-based feature system was also trained with the same architecture, but used 512 output targets. A principal component analysis (PCA) is applied on top of the DNN before softmax to reduce the dimensionality from 512 to 40. Using these DNN-based features, maximum-likelihood Gaussian Mixture Model (GMM) training was applied, followed by feature and model-space discriminative training using the BMMI criterion. In order to fairly compare results to the DNN hybrid system, no MLLR was applied to the DNN feature based system. The old CNN systems (not incorporating the embodiments of the present invention) were trained with VTLN-warped log-mel+d+dd features, and a sigmoid non-linearity. The proposed CNN-based systems were trained with the fMLLR features and ReLU+Dropout described herein in accordance with embodiments of the present invention.

Results for 50-Hour English Broadcast News

Table 5 shows the performance of proposed CNN-based feature and hybrid systems, and compares the performance to the DNN and old CNN systems. The proposed CNN hybrid system offers between a 6-7% relative improvement over the DNN hybrid, and a 2-3% relative improvement over the old CNN hybrid system. The proposed CNN based feature system offers a 1% improvement over the old CNN-based feature system. Large relative improvements in WER (10-12%) on a hybrid sequence trained DNN with 512 output targets were observed, compared to a hybrid CE-trained DNN. However, after features are extracted from both systems, the gains diminish down to 1-2% relative. Feature-based systems use the neural network to learn a feature transformation, and appear to saturate in performance even when the hybrid system used to extract the features improves. Thus, as the table shows, there appears to be more potential to improve a hybrid system as opposed to a feature-based system.

TABLE 5

WER on Broadcast News, 50 hours

| model | dev04f | rt04 |
|---|---|---|
| Hybrid DNN | 16.3 | 15.8 |
| Old Hybrid CNN [4] | 15.8 | 15.0 |
| Proposed Hybrid CNN | 15.4 | 14.7 |
| DNN-based Features | 17.4 | 16.6 |
| Old CNN-based Features [4] | 15.5 | 15.2 |
| Proposed CNN-based Features | 15.3 | 15.1 |

Experimental Setup for 400-Hour English Broadcast News

Scalability of the proposed techniques in accordance with embodiments of the present invention was explored on 400 hours of English Broadcast News. Development was done on the Defense Advanced Research Projects Agency (DARPA) Effective Affordable Reusable Speech-to-Text (EARS) dev04f set. Testing was done on the DARPA EARS rt04 evaluation set. The DNN hybrid system uses fMLLR features, with a 9-frame context, and uses five hidden layers each containing 1,024 sigmoidal units. The DNN-based feature system is trained with 512 output targets, while the hybrid system has 5,999 output targets. Results are reported after HF sequence training. Again, the proposed CNN-based systems are trained with the fMLLR features and ReLU+Dropout described herein in accordance with embodiments of the present invention.

Results for 400-Hour English Broadcast News

Table 6 shows the performance of the proposed CNN system compared to DNNs and the old CNN system. While the proposed 512-hybrid CNN-based feature system did improve (14.1 WER) over the old CNN (14.8 WER), performance slightly deteriorates after CNN-based features are extracted from the network. However, the 5,999-hybrid CNN offers between a 13-16% relative improvement over the DNN hybrid system, and between a 4-5% relative improvement over the old CNN-based features systems. Accordingly, hybrid CNNs may have more potential for improvement, and the proposed fMLLR and ReLU+dropout techniques, in accordance with embodiments of the present invention, provide substantial improvements over DNNs and CNNs with a sigmoid non-linearity and VTLN-warped log-mel features.

TABLE 6

WER on Broadcast News, 400 hrs

| model | dev04f | rt04 |
|---|---|---|
| Hybrid DNN | 15.1 | 13.4 |
| DNN-based Features | 15.3 | 13.5 |
| Old CNN-based Features [4] | 13.4 | 12.2 |
| Proposed CNN-based Features | 13.6 | 12.5 |
| Proposed Hybrid CNN | 12.7 | 11.7 |

Embodiments of the present invention provide various strategies to improve CNN performance, by incorporating fMLLR into CNN features, and also making dropout effective after HF sequence training. For example, the proposed fMLLR+dropout techniques of the embodiments of the present invention were able to improve previous best CNN results by about 2%-5% relative.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
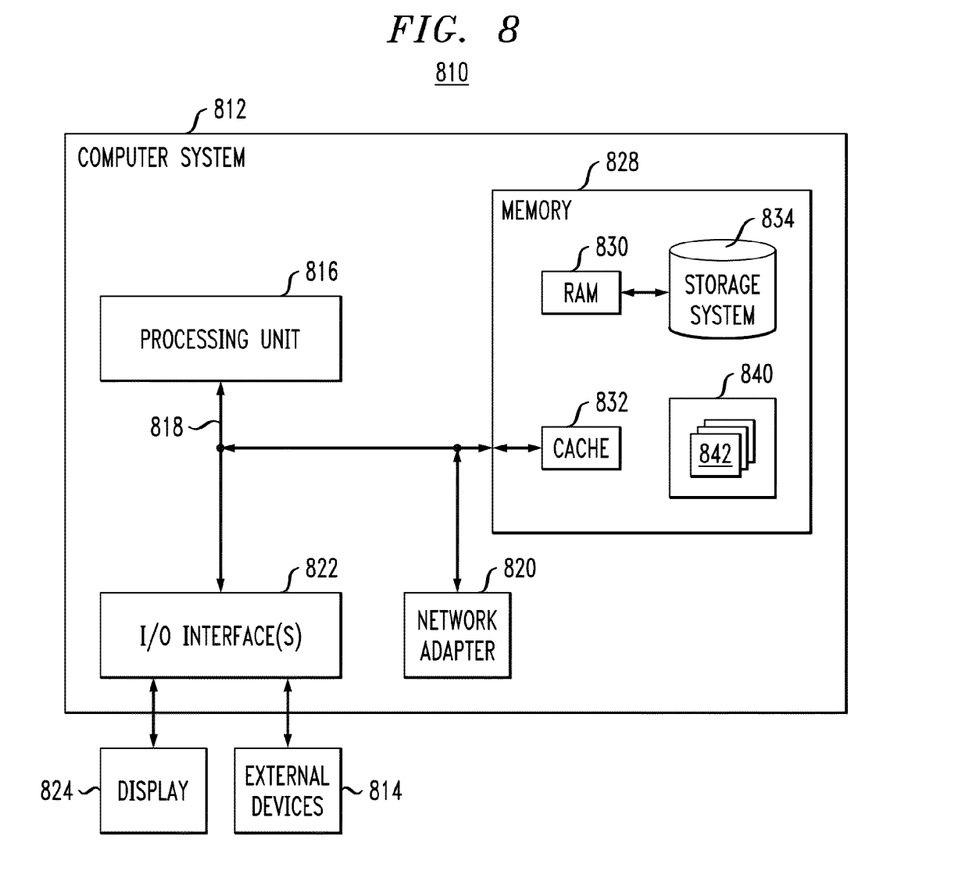
FIG. 8 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 8, in a computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

The bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 812 typically includes a variety of computer system readable media. Such media may be any available media that is accessible by computer system/server 812, and it includes both volatile and non-volatile media, removable and non-removable media.

The system memory 828 can include computer system readable media in the form of volatile memory, such as random access memory (RAM) 830 and/or cache memory 832. The computer system/server 812 may further include other removable/non-removable, volatile/nonvolatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 818 by one or more data media interfaces. As depicted and described herein, the memory 828 may include at least one program product having a set (e.g., at least one) of program modules that are configured to carry out the functions of embodiments of the invention. A program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc., one or more devices that enable a user to interact with computer system/server 812, and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A system for applying feature-space maximum likelihood linear regression (fMLLR) to correlated features, the system comprising:
    at least one memory and at least one processor operatively coupled to the at least one memory;
    a semi-tied covariance (STC) module executed via the at least one processor, and capable of mapping the correlated features into an uncorrelated feature space;
    an fMLLR module executed via the at least one processor, and capable of applying fMLLR in the uncorrelated feature space to obtain fMLLR transformed features; and
    a return module executed via the at least one processor, and capable of mapping the fMLLR transformed features back to a correlated feature space;
    wherein the system obtains the correlated features by:
        receiving an input signal;
        computing a transform of the input signal; and
        applying a filter bank to the transformed input signal.

2. The system according to claim 1, wherein the STC module is further capable of estimating an STC matrix in the correlated feature space and applying the STC matrix to the correlated features to map STC features into the uncorrelated feature space.

3. The system according to claim 2, wherein the STC module is further capable of:
    estimating a diagonal covariance matrix from the correlated features; and
    estimating a block diagonal transform of a covariance matrix using the correlated features and the diagonal covariance matrix.

4. The system according to claim 2, wherein the fMLLR module is further capable of estimating an fMLLR matrix and applying the fMLLR matrix to the STC features to obtain the fMLLR transformed features.

5. The system according to claim 4, wherein the return module is further capable of multiplying the fMLLR transformed features by an inverse of the STC matrix.

6. The system according to claim 4, wherein the fMLLR module is further capable of:
    estimating the fMLLR matrix per each speaker of a plurality of speakers; and
    multiplying the fMLLR matrix by the STC features.

7. The system according to claim 1, wherein the correlated features comprise log-mel filter bank coefficients.

8. The system according to claim 1, further comprising an application module capable of using the fMLLR transformed features mapped back to the correlated feature space with a convolutional neural network.

9. The system according to claim 1, further comprising a sequence training module capable of using a dropout technique during Hessian-Free (HF) sequence training of a convolutional neural network, wherein a dropout mask is fixed per utterance for all iterations of conjugate gradient (CG) within a single HF iteration.

10. A method for applying feature-space maximum likelihood linear regression (fMLLR) to correlated features, the method comprising:
    obtaining the correlated features by:
        receiving an input signal;
        computing a transform of the input signal; and
        applying a filterbank to the transformed input signal;
    mapping the correlated features into an uncorrelated feature space;
    applying fMLLR in the uncorrelated feature space to obtain fMLLR transformed features; and
    mapping the fMLLR transformed features back to a correlated feature space;
    wherein the method is performed by at least one computer system comprising at least one memory and at least one processor operatively coupled to the at least one memory.

11. The method according to claim 10, wherein mapping the correlated features into the uncorrelated feature space comprises estimating a semi-tied covariance (STC) matrix in the correlated feature space and applying the STC matrix to the correlated features to map STC features into the uncorrelated feature space.

12. The method according to claim 11, wherein estimating the STC matrix in the correlated feature space comprises:
   estimating a diagonal covariance matrix from the correlated features; and
   estimating a block diagonal transform of a covariance matrix using the correlated features and the diagonal covariance matrix.

13. The method according to claim 11, wherein applying fMLLR in the uncorrelated feature space comprises estimating an fMLLR matrix and applying the fMLLR matrix to the STC features to obtain the fMLLR transformed features.

14. The method according to claim 13, wherein mapping the fMLLR transformed features back to the correlated feature space comprises multiplying the fMLLR transformed features by an inverse of the STC matrix.

15. The method according to claim 13, wherein estimating the fMLLR matrix and applying the fMLLR matrix to the STC features comprises:
   estimating the fMLLR matrix per each speaker of a plurality of speakers; and
   multiplying the fMLLR matrix by the STC features.

16. The method according to claim 10, wherein the correlated features comprise log-mel filter bank coefficients.

17. The method according to claim 10, further comprising using the fMLLR transformed features mapped back to the correlated feature space with a convolutional neural network.

18. The method according to claim 10, further comprising using a dropout technique during Hessian-Free (HF) sequence training of a convolutional neural network, wherein a dropout mask is fixed per utterance for all iterations of conjugate gradient (CG) within a single HF iteration.

19. A computer program product for applying feature-space maximum likelihood linear regression (fMLLR) to correlated features, the computer program product comprising a tangible computer readable medium having program instructions embodied therewith, the program instructions executable by a processor to cause the processor to perform a method comprising:
   obtaining the correlated features by:
      receiving an input signal;
      computing a transform of the input signal; and
      applying a filterbank to the transformed input signal;
   mapping the correlated features into an uncorrelated feature space;
   applying fMLLR in the uncorrelated feature space to obtain fMLLR transformed features; and
   mapping the fMLLR transformed features back to a correlated feature space.

20. The computer program product according to claim 19, wherein mapping the correlated features into the uncorrelated feature space comprises estimating a semi-tied covariance (STC) matrix in the correlated feature space and applying the STC matrix to the correlated features to map STC features into the uncorrelated feature space.

* * * * *